United States Patent
Muramatsu et al.

(10) Patent No.: US 11,285,837 B2
(45) Date of Patent: Mar. 29, 2022

(54) CHARGING PROCESSING SYSTEM

(71) Applicants: TOYOTA JIDOSHA KABUSHIKI KAISHA, Toyota (JP); CHUBU ELECTRIC POWER CO., INC., Nagoya (JP)

(72) Inventors: Makito Muramatsu, Toyota (JP); Takumi Shibano, Nagoya (JP); Masashi Tanaka, Nagakute (JP); Takashi Ochiai, Nagoya (JP); Takeharu Fukui, Nagoya (JP); Yoshihiro Takamura, Nagoya (JP); Takahiro Yokogawa, Nagoya (JP); Masashi Ohgashira, Nagoya (JP)

(73) Assignees: TOYOTA JIDOSHA KABUSHIKI KAISHA, Toyota (JP); CHUBU ELECTRIC POWER CO., INC., Nagoya (JP)

( * ) Notice: Subject to any disclaimer, the term of this patent is extended or adjusted under 35 U.S.C. 154(b) by 88 days.

(21) Appl. No.: 16/713,257

(22) Filed: Dec. 13, 2019

(65) Prior Publication Data

US 2020/0198493 A1    Jun. 25, 2020

(30) Foreign Application Priority Data

Dec. 21, 2018    (JP) .............................. JP2018-240081

(51) Int. Cl.
*G06Q 30/02* (2012.01)
*B60L 53/66* (2019.01)
(Continued)

(52) U.S. Cl.
CPC .......... *B60L 53/665* (2019.02); *G06Q 20/206* (2013.01); *G06Q 30/0238* (2013.01);
(Continued)

(58) Field of Classification Search
CPC ..................................................... G06Q 30/02
See application file for complete search history.

(56) References Cited

U.S. PATENT DOCUMENTS

| | | | |
|---|---|---|---|
| 2009/0144149 A1 | 6/2009 | Sakakibara et al. | |
| 2012/0150359 A1* | 6/2012 | Westergaard | G06Q 30/0202 |
| | | | 700/291 |

(Continued)

FOREIGN PATENT DOCUMENTS

| | | | | |
|---|---|---|---|---|
| JP | 2006-244392 A | * | 9/2006 | ............... B60S 5/00 |
| JP | 2009134450 A | | 6/2009 | |

(Continued)

OTHER PUBLICATIONS

C Kong; B Prasad Rimal; M Maier; Islam Safak Bayram; M Devetsikiotis, Cloud-Based Charging Management of Heterogeneous Elec Vehicles in a Network of Charging Stations: Price Incentive vs. Capacity Expansion (English), IEEE Transactions on Services Computing (vol. PP, Issue:99, p. 1) (Year: 2020).*

(Continued)

*Primary Examiner* — Marilyn G Macasiano
(74) *Attorney, Agent, or Firm* — Dickinson Wright, PLLC (57) ABSTRACT

A charging processing system includes: a power supply facility that supplies $CO_2$ free power; electrically powered vehicles that each perform $CO_2$ free charging to charge an onboard power storage device using the $CO_2$ free power supplied from the power supply facility; mobile terminals portable by users who own the electrically powered vehicles; and a server. The server issues a coupon to a user of an electrically powered vehicle in which the $CO_2$ free charging is performed, the coupon being usable at a shop located around the power supply facility. The server includes: a storage device that stores user attribute information in which a user ID and an attribute of each user are associated with each other; and a control device that extracts (Continued)

a user who has a specific attribute by making reference to the user attribute information and that notifies coupon advance-notice information to the extracted user.

4 Claims, 6 Drawing Sheets

(51) Int. Cl.
    *H02J 7/00* (2006.01)
    *G06Q 20/20* (2012.01)
    *G06Q 20/32* (2012.01)

(52) U.S. Cl.
    CPC ........ *H02J 7/00034* (2020.01); *G06Q 20/322* (2013.01); *H02J 2300/20* (2020.01)

(56) References Cited

U.S. PATENT DOCUMENTS

| | | | |
|---|---|---|---|
| 2012/0249068 A1 | 10/2012 | Ishida | |
| 2014/0312841 A1* | 10/2014 | Baba | B60L 55/00 320/109 |
| 2017/0043671 A1* | 2/2017 | Campbell | B60L 53/80 |
| 2019/0139162 A1 | 5/2019 | Sawada et al. | |
| 2020/0023747 A1* | 1/2020 | Logvinov | B60L 53/66 |
| 2021/0004848 A1* | 1/2021 | Nakajima | B60L 53/65 |

FOREIGN PATENT DOCUMENTS

| | | | | |
|---|---|---|---|---|
| JP | 2013041324 A | 2/2013 | | |
| JP | 2016099801 A | 5/2016 | | |
| JP | 2017041939 A | 2/2017 | | |
| JP | 2019087142 A | 6/2019 | | |
| WO | 2011077780 A1 | 6/2011 | | |
| WO | WO 2019/181700 A1 * | 9/2019 | | B60L 3/00 |

OTHER PUBLICATIONS

O. Rshid; P. Coulton; R. Edwards, Implementing location based information/advertising forexisting mobile phone users in indoor/urban environments (English), International Conference on Moblie Business (ICMB'05) (pp. 377-383), Jan. 1, 2005 (Year: 2005).*

* cited by examiner

USER ATTRIBUTE INFORMATION

| USER ID | USER ATTRIBUTE | | | | | |
|---|---|---|---|---|---|---|
| | SEX | AGE | TENDENCY TO VISIT SHOP | | | USER LOCATION |
| | | | TIME PERIOD | DAY OF WEEK | WEATHER | |
| 0001 | MALE | 20s | EVENING | WEEKEND | FINE | ⋮ |
| 0002 | FEMALE | 40s | EARLY MORNING | WEEKDAY | RAIN | ⋮ |
| ⋮ | ⋮ | ⋮ | ⋮ | ⋮ | ⋮ | ⋮ |

CHARGING PROCESSING SYSTEM

This nonprovisional application is based on Japanese Patent Application No. 2018-240081 filed on Dec. 21, 2018, with the Japan Patent Office, the entire contents of which are hereby incorporated by reference.

BACKGROUND

Field

The present disclosure relates to a charging processing system applied to a charging control system that charges an onboard power storage device using renewable energy.

Description of the Background Art

Japanese Patent Laying-Open No. 2017-41939 discloses a system that externally charges an onboard power storage device using power supplied from a power supply device external to a vehicle. This system includes a charging service provision server and a coupon service provision server. The charging service provision server receives, from a mobile terminal operated by a user, authentication information of the user and information relating to validity of payment information. When the authentication information is valid and the payment information is valid, the charging service provision server transmits a charging start request to the power supply device. Moreover, in response to the start of charging by the power supply device, the charging service provision server requests the coupon service provision server to issue a coupon. In response to the request, the coupon service provision server issues, to the mobile terminal, a coupon usable at a shop located around the power supply device. Accordingly, while waiting during the external charging, the user can use the coupon by way of the mobile terminal at the shop located around the power supply device.

SUMMARY

In recent years, for global environment protection, power generation facilities for generating power using renewable energy (such as solar energy, wind power energy, geothermal energy, and biomass energy) involving low environmental impact, rather than fossil energy (such as oil, coal, and natural gas) involving high environmental impact, are being pervasive. Accordingly, it is desired to develop a technique for promoting external charging using such renewable energy.

However, in the system disclosed in Japanese Patent Laying-Open No. 2017-41939 described above, no technique for promoting external charging with the renewable energy is mentioned at all. Therefore, there is room for improvement.

The present disclosure has been made to solve the above-described problem, and has an object to appropriately promote, to a user who has a specific attribute, (i) external charging using renewable energy and (ii) visiting to a shop located around the place of the external charging.

It should be noted that in the description below, power generated using the renewable energy will be also referred to as "$CO_2$ free power", and external charging with such $CO_2$ free power will be also referred to as "$CO_2$ free charging".

(1) A charging processing system according to the present disclosure includes: a power supply facility that supplies $CO_2$ free power generated using renewable energy; a plurality of electrically powered vehicles that each perform $CO_2$ free charging to charge an onboard power storage device using the $CO_2$ free power supplied from the power supply facility; a plurality of respective mobile terminals portable by a plurality of respective users each of who owns a corresponding electrically powered vehicle; and a server that issues a coupon to a mobile terminal of a user of an electrically powered vehicle in which the $CO_2$ free charging is performed among the plurality of electrically powered vehicles, the coupon being usable at a shop located around the power supply facility. The server includes a storage device and a control device. The storage device stores, for each of the plurality of users, user attribute information in which information for specifying each of the plurality of users and information indicating an attribute of each of the plurality of users are associated with each other. The control device extracts a user who has a specific attribute by making reference to the user attribute information and that notifies, to a mobile terminal of the extracted user, coupon advance-notice information about the coupon to be issued.

According to the above-described system, the coupon usable at the shop located around the power supply facility is issued to the mobile terminal of the user of the electrically powered vehicle in which the $CO_2$ free charging is performed. Further, the coupon advance-notice information about the coupon to be issued is notified to the mobile terminal of the user who has the specific attribute. Accordingly, the coupon advance-notice information can be notified by targeting the user who has the specific attribute. As a result, the $CO_2$ free charging and the visiting to the shop can be promoted appropriately to the user who has the specific attribute.

(2) In a certain embodiment, the user attribute information includes information about a time period in which each of the plurality of users tends to visit the shop. When the specific attribute represents a tendency to visit the shop in a specific time period, the control device extracts a user who tends to visit the shop in the specific time period by making reference to the user attribute information, and notifies the coupon advance-notice information to a mobile terminal of the extracted user.

According to the above-described embodiment, the coupon advance-notice information can be notified by targeting the user who tends to visit the shop in the specific time period.

(3) In a certain embodiment, the specific time period includes a time period in which a customer attracting rate of the shop is higher than a predetermined rate. The coupon advance-notice information includes information indicating that the coupon is issued in a time period in which the customer attracting rate of the shop is lower than the predetermined rate.

According to the above-described embodiment, the user who tends to visit the shop in the time period in which the customer attracting rate of the shop is higher than the predetermined rate (for example, an evening time period in which the shop is considerably crowded) is notified of the advance-notice information about the coupon to be issued in the time period in which the customer attracting rate of the shop is lower than the predetermined rate (for example, a daytime time period on a weekday in which the shop is not so crowded). Accordingly, it can be expected to level out a crowded situation in the shop. Moreover, since the user can receive a profit of the coupon in the time period in which the shop is not so crowded, a waiting time for the $CO_2$ free charging can be utilized more effectively.

(4) In a certain embodiment, the user attribute information includes location information of each of the plurality of users. When the specific attribute represents presence in a specific place, the control device extracts a user who is present in the specific place by making reference to the user attribute information, and notifies the coupon advance-notice information to a mobile terminal of the extracted user.

According to the above-described embodiment, the $CO_2$ free charging and the visiting to the shop can be promoted appropriately to the user who is present in the specific place (for example, a different shop located around the shop).

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

The following describes embodiments of the present disclosure with reference to figures in detail. It should be noted that the same or corresponding portions in the figures are given the same reference characters and are not described repeatedly.

<System Configuration>

Figure 1:
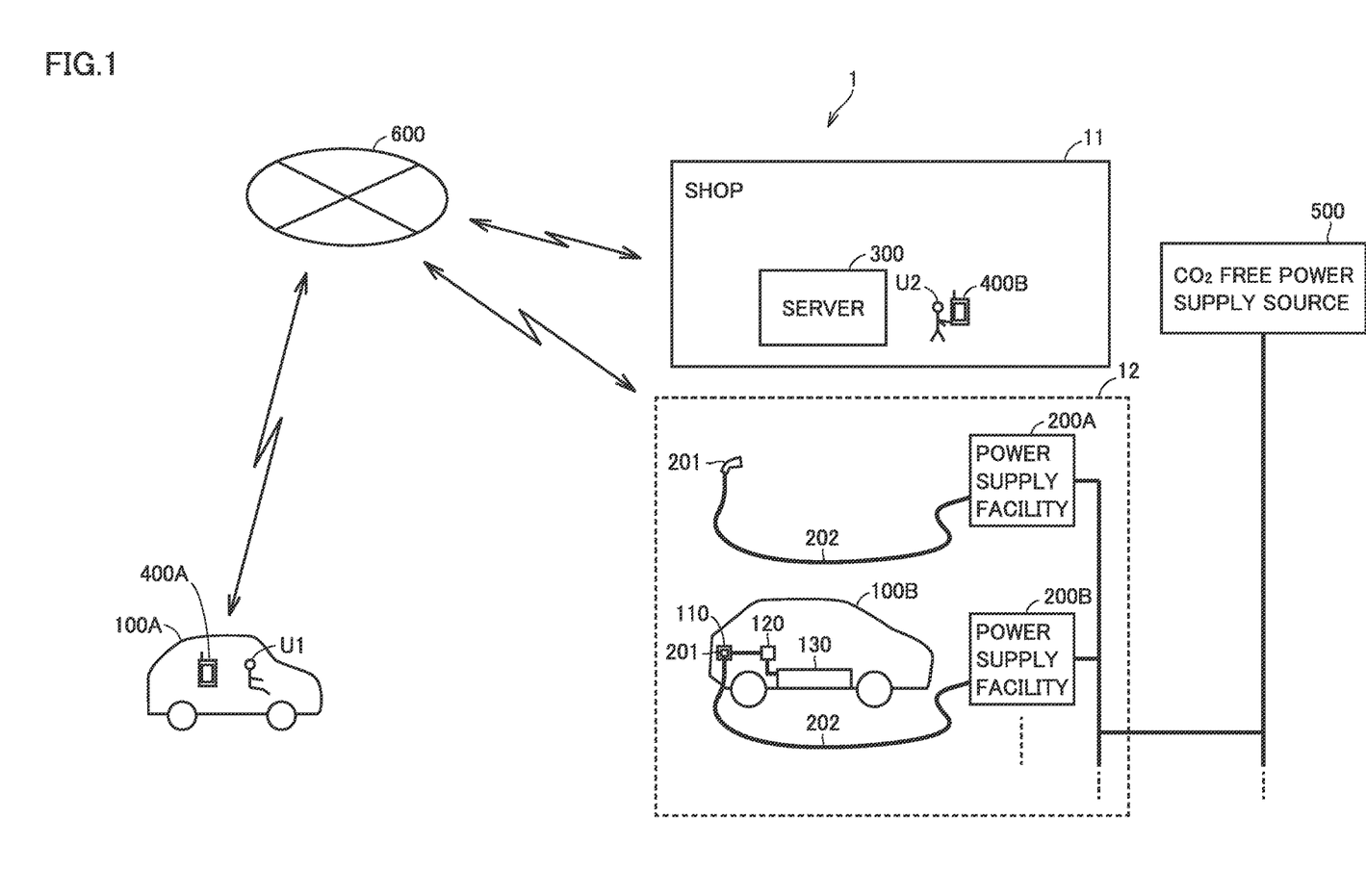
FIG. 1 schematically shows an exemplary entire configuration of a charging processing system.

FIG. 1 schematically shows an exemplary entire configuration of a charging processing system 1 according to the present embodiment. This charging processing system 1 includes vehicles 100A, 100B, power supply facilities 200A, 200B, a server 300, and mobile terminals 400A, 400B.

It should be noted that the basic configurations of vehicle 100A, power supply facility 200A, and mobile terminal 400A are the same as the basic configurations of vehicle 100B, power supply facility 200B, and mobile terminal 400B, respectively. Therefore, in the description below, vehicle 100A and vehicle 100B may be described also as "vehicle 100" without distinguishing vehicle 100A and vehicle 100B from each other, power supply facility 200A and power supply facility 200B may be described also as "power supply facility 200" without distinguishing power supply facility 200A and power supply facility 200B from each other, and mobile terminal 400A and mobile terminal 400B may be described also as "mobile terminal 400" without distinguishing mobile terminal 400A and mobile terminal 400B from each other, unless they are described in a distinguished manner.

Power supply facility 200 is installed in a parking area 12 adjacent to a shop 11. It should be noted that any number of power supply facilities 200 may be installed in parking area 12. One or a plurality of (two or more) power supply facilities 200 may be installed. Shop 11 may be a facility including a plurality of shops such as a shopping center, or may be one shop.

Power supply facility 200 includes a charging cable 202 having a connector 201 at its tip, and can supply power to vehicle 100 via charging cable 202. Power supply facility 200 is connected to a $CO_2$ free power supply source 500, and receives, from $CO_2$ free power supply source 500, power (hereinafter, also referred to as "$CO_2$ free power") generated using renewable energy. Renewable energy is energy (such as solar energy, wind power energy, geothermal energy, and biomass energy) that is not exhausted, that can be used repeatedly, and that involves low environmental impact. Power supply facility 200 can supply vehicle 100 with the $CO_2$ free power received from $CO_2$ free power supply source 500. It should be noted that $CO_2$ free power supply source 500 may be a facility itself that is installed by shop 11 and that generates $CO_2$ free power, or may be a facility that is operated by an electric power company or the like and that aggregates $CO_2$ free power generated in a plurality of areas. Moreover, the $CO_2$ free power may be power obtained by adding an environmental value to fossil-derived power by way of J-Credit, Non-Fossil Fuel Energy Certificate, or the like.

Vehicle 100 includes an inlet 110, a power conversion device 120, and a power storage device 130. Vehicle 100 is an electrically powered vehicle (such as a plug-in hybrid vehicle or an electric vehicle) that can travel using power stored in power storage device 130. Examples of power storage device 130 employed herein include: a secondary battery such as a lithium ion battery or a nickel-metal hydride battery; and a large-capacity capacitor.

In vehicle 100, the "$CO_2$ free charging" can be performed to charge onboard power storage device 130 using the $CO_2$ free power supplied from power supply facility 200 external to the vehicle. Specifically, the $CO_2$ free power received by inlet 110 from power supply facility 200 is supplied to power storage device 130 via power conversion device 120. In this way, the $CO_2$ free charging is performed. It should be noted that during the $CO_2$ free charging, vehicle 100 and power supply facility 200 may be configured to wiredly communicate with each other via charging cable 202.

FIG. 1 shows an example in which: vehicle 100A is driven by a user U1, who is an owner of vehicle 100A, to travel toward parking area 12 of shop 11; the $CO_2$ free charging is being performed in vehicle 100B with vehicle 100B being connected to power supply facility 200B installed in parking area 12 of shop 11; and a user U2, who is an owner of vehicle 100B, is doing shopping at shop 11 during waiting time for the $CO_2$ free charging.

Mobile terminal 400 is a terminal (for example, a smartphone or a wearable device such as a smartwatch) portable by the owner of vehicle 100. It should be noted that mobile terminals 400A, 400B shown in FIG. 1 are carried by users U1, U2, respectively.

For convenience of description, FIG. 1 illustrates two vehicles 100 (100A, 100B) and two mobile terminals 400 (400A, 400B). However, it is considered that each of the number of vehicles 100 applied to charging processing system 1 according to the present embodiment and the number of mobile terminals 400 applied to charging processing system 1 according to the present embodiment is more than two.

Server 300 is provided in shop 11, and issues a coupon usable at shop 11. It should be noted that FIG. 1 shows an example in which server 300 is provided in shop 11; however, server 300 is not limited to being provided in shop 11. For example, a part or whole of the function of server 300 may be provided outside shop 11.

Vehicle 100, power supply facility 200, server 300, and mobile terminal 400 can wiredly or wirelessly access a communication network 600 and can communicate with one another via communication network 600. For communication network 600, any communication network can be employed. Communication network 600 may be the Internet.

With reference to FIG. 2 to FIG. 5, the following sequentially describes respective configurations of vehicle 100, power supply facility 200, server 300, and mobile terminal 400.

Figure 2:
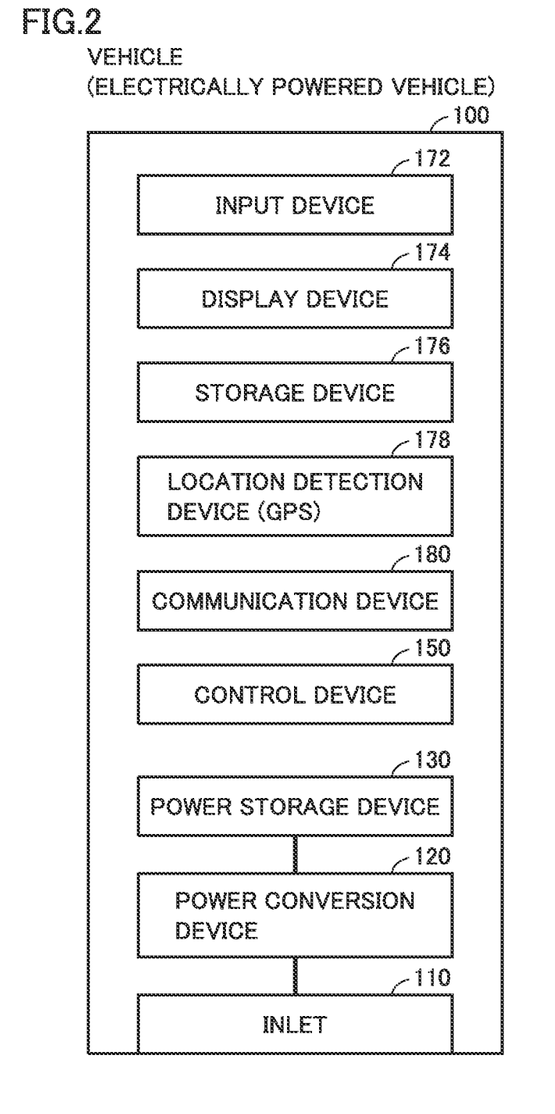
FIG. 2 schematically shows an exemplary configuration of a vehicle.

FIG. 2 schematically shows an exemplary configuration of vehicle 100. In addition to inlet 110, power conversion device 120, and power storage device 130 described above, vehicle 100 includes an input device 172, a display device 174, a storage device 176, a location detection device 178, a communication device 180, and a control device 150.

Input device 172 is constituted of a touch panel, a switch, or the like, and receives an operation by the user. Display device 174 is constituted of, for example, a liquid crystal panel, and presents, to the user, various types of information in accordance with instructions from control device 150.

Storage device 176 stores various pieces of information such as: information used for various types of control; information input into input device 172; and information received by communication device 180 from the outside.

Location detection device 178 uses GPS (Global Positioning System) to detect information indicating a current location (longitude and latitude) of vehicle 100.

Communication device 180 is an interface for communicating with power supply facility 200, server 300, and mobile terminal 400 via communication network 600.

Control device 150 is configured to include a CPU (Central Processing Unit), and performs control (the above-described $CO_2$ free charging or the like) for each device of vehicle 100.

Figure 3:
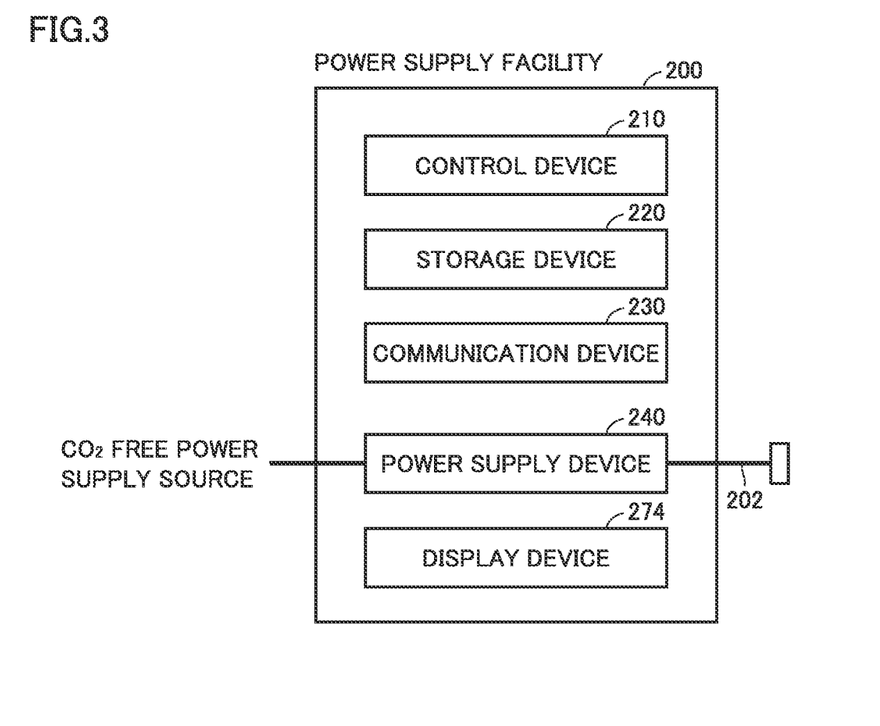
FIG. 3 schematically shows an exemplary configuration of a power supply facility.

FIG. 3 schematically shows an exemplary configuration of power supply facility 200. Power supply facility 200 includes a control device 210, a storage device 220, a communication device 230, a power supply device 240, and a display device 274.

Communication device 230 is an interface for communicating with vehicle 100, server 300, and mobile terminal 400 via communication network 600, for example.

Power supply device 240 is a device for supplying, to vehicle 100 via charging cable 202, the $CO_2$ free power supplied from $CO_2$ free power supply source 500.

Storage device 220 stores various pieces of information such as: information used for various types of control; information received by communication device 230 from outside; and history information of the $CO_2$ free power supplied to vehicle 100 by power supply device 240.

Display device 274 is constituted of, for example, a liquid crystal panel, and presents, to the user, various types of information in accordance with instructions from control device 210.

Control device 210 is configured to include a CPU (Central Processing Unit), and performs control for each device of power supply facility 200.

Figure 4:
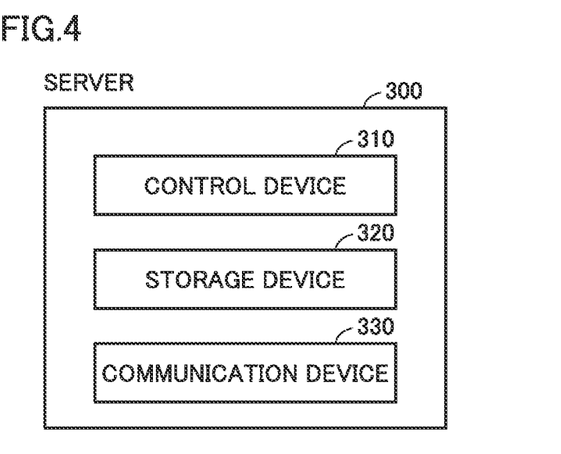
FIG. 4 schematically shows an exemplary configuration of a server.

FIG. 4 schematically shows an exemplary configuration of server 300. Server 300 includes a control device 310, a storage device 320, and a communication device 330.

Communication device 330 is an interface for communicating with vehicle 100, power supply facility 200, and mobile terminal 400 via communication network 600, for example.

Storage device 320 stores various pieces of information such as: information used for various types of control; and information received by communication device 330 from outside.

It should be noted that "power supply facility information" is stored in storage device 320 in advance. In the power supply facility information, a power supply facility ID for specifying power supply facility 200 is associated with the installation location of power supply facility 200 specified by the power supply facility ID. Moreover, in storage device 320, "user attribute information" is registered in advance. In the user attribute information, an user ID for specifying the user of mobile terminal 400 having a below-described coupon application installed thereon is associated with attribution information (sex, age, and the like) of the user. In the description below, the user registered in the user attribute information will be also referred to as "registered user".

Control device 310 is configured to include a CPU (Central Processing Unit), and performs control for each device of server 300. Control device 310 communicates with mobile terminal 400, and performs a process for issuing, to mobile terminal 400, a coupon usable at shop 11.

Figure 5:
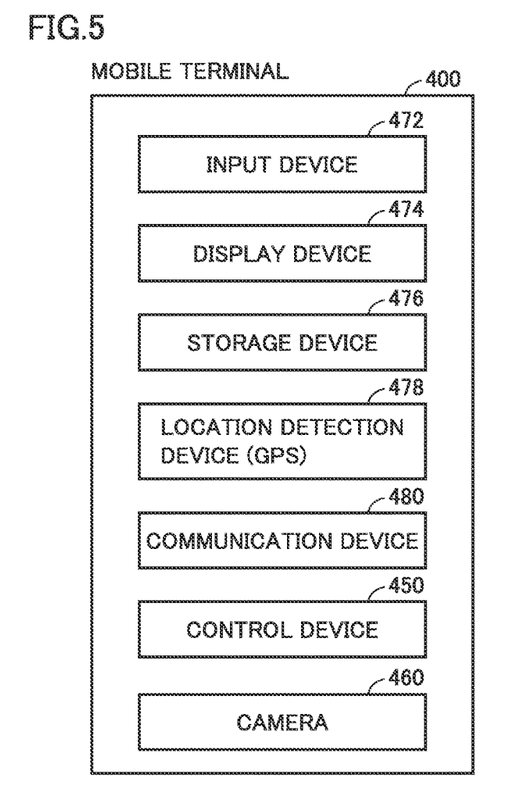
FIG. 5 schematically shows an exemplary configuration of a mobile terminal.

FIG. 5 schematically shows an exemplary configuration of mobile terminal 400. Mobile terminal 400 includes an input device 472, a display device 474, a storage device 476, a location detection device 478, a communication device 480, a control device 450, and a camera 460.

Input device 472 is constituted of a touch panel, a switch, or the like, and receives an operation by the user. Display device 474 is constituted of, for example, a liquid crystal panel, and presents, to the user, various types of information in accordance with instructions from control device 450.

Storage device 476 stores various pieces of information such as: information used for various types of control; information input into input device 472; and information received by communication device 480 from outside.

Location detection device 478 uses GPS (Global Positioning System) to detect information indicating a current location (longitude and latitude; hereinafter, also referred to as "user location") of mobile terminal 400.

Communication device 480 is an interface for communicating with vehicle 100, power supply facility 200, and server 300 via communication network 600, for example.

Control device 450 is configured to include a CPU (Central Processing Unit), and performs control for each device of mobile terminal 400.

It should be noted that mobile terminal 400 has a dedicated application (hereinafter, also referred to as "coupon application") installed thereon to request server 300 to issue a coupon and receive the coupon from server 300. When installing this coupon application, the user of mobile terminal 400 inputs his/her attribution information (sex, age, and the like) and transmits it to server 300. This attribution information is registered, together with the user ID, in the user attribute information stored in storage device 320 of server 300.

Figure 6:
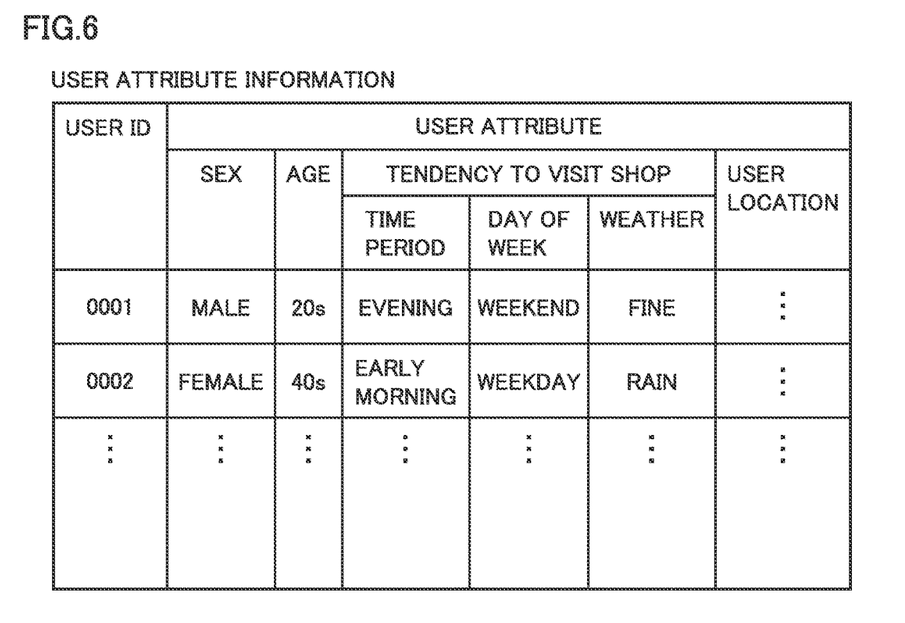
FIG. 6 shows exemplary user attribute information stored in a storage device of the server.

FIG. 6 shows exemplary user attribute information stored in storage device 320 of server 300.

In the user attribute information, information of a user ID for specifying the registered user and information of a user attribute indicating an attribute of each user are stored in association with each other.

As shown in FIG. 6, the user attribute includes: the sex and age of the user; a time period, a day of a week, and weather in or on which the user tends to visit the shop; and the user location. The information about the sex and age in the user attribute is information input by the registered user when installing the coupon application. The information about the tendency to visit the shop is set based on a history of each user having visited shop 11, for example. The information about the user location is information transmitted from mobile terminal 400 of each user at a predetermined cycle, for example.

<Issuance of Coupon Accompanied with $CO_2$ Free Charging>

In order to promote the $CO_2$ free charging and attract customers to shop 11, server 300 according to the present embodiment performs a process (hereinafter, also referred to as "coupon issuance process") for issuing a coupon usable at shop 11 to the registered user of vehicle 100 in which the $CO_2$ free charging is performed using power supply facility 200 installed in parking area 12 of shop 11.

For example, when the user pushes a $CO_2$ free charging start button (not shown) provided in power supply facility 200, power supply facility 200 presents code information (for example, QR Code (registered trademark) or the like) on display device 274. The code information indicates the power supply facility ID of power supply facility 200 and information indicating an access destination for server 300.

Mobile terminal 400 uses camera 460 to read the code information presented on display device 274 of power supply facility 200, accesses the access destination included in the read code information, and transmits coupon request information to server 300. This coupon request information includes: information indicating the power supply facility ID included in the code information; information indicating the user ID of the user who carries mobile terminal 400; information indicating the user location detected by location detection device 478; and information indicating the current time, for example.

When the coupon request information is received from mobile terminal 400, server 300 makes reference to the power supply facility information stored in storage device 320 so as to specify the installation location of the power supply facility corresponding to the power supply facility ID included in the coupon request information, and determines whether or not a distance between the specified installation location of the power supply facility and the user location included in the coupon request information is less than a predetermined value. When the distance between the installation location of the power supply facility and the user location is less than the predetermined value, server 300 issues a coupon to mobile terminal 400 corresponding to the user ID included in the coupon request information.

Mobile terminal 400 receives the coupon issued from server 300. The user presents, on display device 474, the information indicating the coupon and received from server 300 so as to show it at shop 11, whereby the coupon can be used at shop 11.

It should be noted that the above-described coupon issuance process is just exemplary and the coupon issuance process is not limited thereto. Moreover, in the above-described coupon issuance process, the coupon is transmitted from server 300 to mobile terminal 400; however, it is not necessarily limited to transmitting the coupon from server 300 to mobile terminal 400. For example, the coupon may be managed within server 300. That is, the coupon can be used in the following manner: server 300 manages information of the coupon issued for the user ID and mobile terminal 400 accesses server 300.

<Advance Notice of Coupon>

Moreover, server 300 according to the present embodiment performs a process (hereinafter, also referred to as "coupon advance-notice process") for notifying, to the registered user, information (hereinafter, also referred to as "coupon advance-notice information") about a coupon to be issued.

Figure 7:
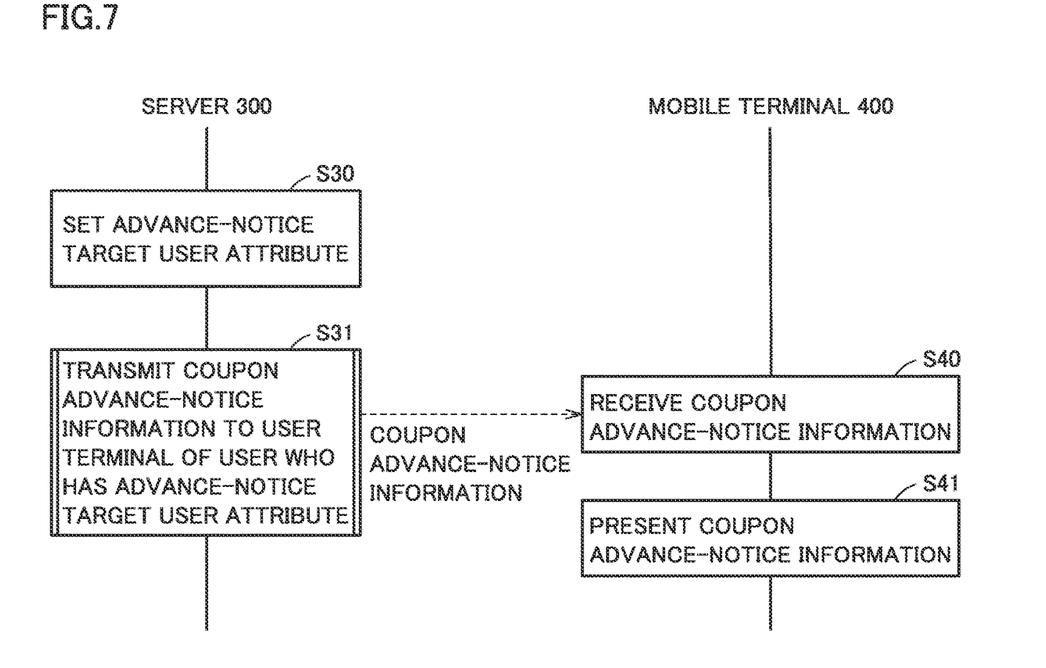
FIG. 7 is a sequence diagram showing an exemplary overview of a coupon advance-notice process and a process associated with the coupon advance-notice process.

FIG. 7 is a sequence diagram showing an exemplary overview of the coupon advance-notice process and a process associated with the coupon advance-notice process. These processes are associated with server 300 (more specifically, control device 310) and mobile terminal 400 (more specifically, control device 450).

Server 300 sets an attribute (hereinafter, also referred to as "advance-notice target user attribute") of a user to be notified of the coupon advance-notice information (step S30). The advance-notice target user attribute can be appropriately set to server 300 by shop 11, for example. For example, the advance-notice target user attribute (specific attribute) can be set to the following attribute: an attribute representing "a tendency to visit shop 11 in a specific time period"; an attribute representing "presence in a specific place"; or the like.

Next, server 300 transmits the coupon advance-notice information to mobile terminal 400 of the user who has the advance-notice target user attribute thus set (step S31). The coupon advance-notice information includes various pieces of information such as a date, a day of a week, and a time period, the number of issued coupons, monetary amounts of issued coupons, a shop, a merchandise item, and a service with regard to the coupon to be issued. A timing to transmit the coupon advance-notice information can be set appropriately. For example, the coupon advance-notice information may be transmitted at a predetermined timing (for example, a specific time on a specific day of a week), or at a timing that is changed depending on a situation as to attracted customers in shop 11 or the like.

Mobile terminal 400 receives the coupon advance-notice information from server 300 (step S40), and presents the received coupon advance-notice information on display device 474 (step S41). Accordingly, the coupon advance-notice information is presented to the registered user, thus promoting the registered user to visit shop 11 and perform the $CO_2$ free charging.

Then, mobile terminal 400 stores the received coupon advance-notice information into storage device 476. The user can operate input device 472 as required, to read out the coupon advance-notice information stored in storage device 476 and present it on display device 474.

Figure 8:
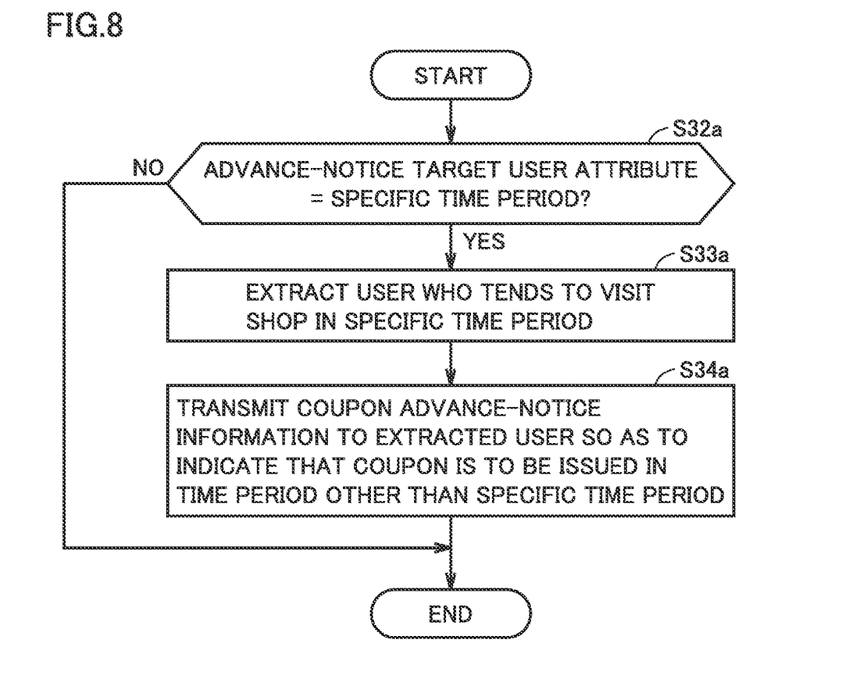
FIG. 8 is a first flowchart showing an exemplary procedure of the coupon advance-notice process performed by the server.

FIG. 8 is a flowchart showing an exemplary procedure of the coupon advance-notice process (step S31 of FIG. 7) performed by server 300 when the advance-notice target user attribute (specific attribute) is set to the attribute representing "the tendency to visit shop 11 in the specific time period".

Server 300 determines whether or not the advance-notice target user attribute is set to the attribute representing "the tendency to visit shop 11 in the specific time period" (step S32a). It should be noted that the "specific time period" can be set to a time period in which the customer attracting rate of shop 11 is higher than a predetermined rate (for example, an evening time period in which the shop is considerably crowded), for example.

When the advance-notice target user attribute is not set to the attribute representing "the tendency to visit shop 11 in the specific time period" (NO in step S32a), server 300 skips subsequent processes and ends the process.

When the advance-notice target user attribute is set to the attribute representing "the tendency to visit shop 11 in the specific time period" (YES in step S32a), server 300 extracts a user who tends to visit shop 11 in the specific time period by making reference to the user attribute information (FIG. 6) stored in storage device 320 (step S33a).

Next, server 300 transmits the coupon advance-notice information to mobile terminal 400 of the extracted user so as to indicate that a coupon is to be issued in a time period other than the specific time period (step S34a).

For example, when the "specific time period" is set to a time period in which the customer attracting rate of shop 11 is higher than the predetermined rate (for example, an evening time period in which the shop is considerably crowded), server 300 transmits the coupon advance-notice information to mobile terminal 400 so as to indicate that a coupon is to be issued in a time period in which the customer attracting rate of shop 11 is lower than the predetermined rate (for example, a daytime time period on a weekday in which the shop is not so crowded). Accordingly, it can be expected to level out a crowded situation in shop 11. Moreover, since the user can receive a profit of the coupon in the time period in which shop 11 is not so crowded, a waiting time for the $CO_2$ free charging can be utilized more effectively.

Figure 9:
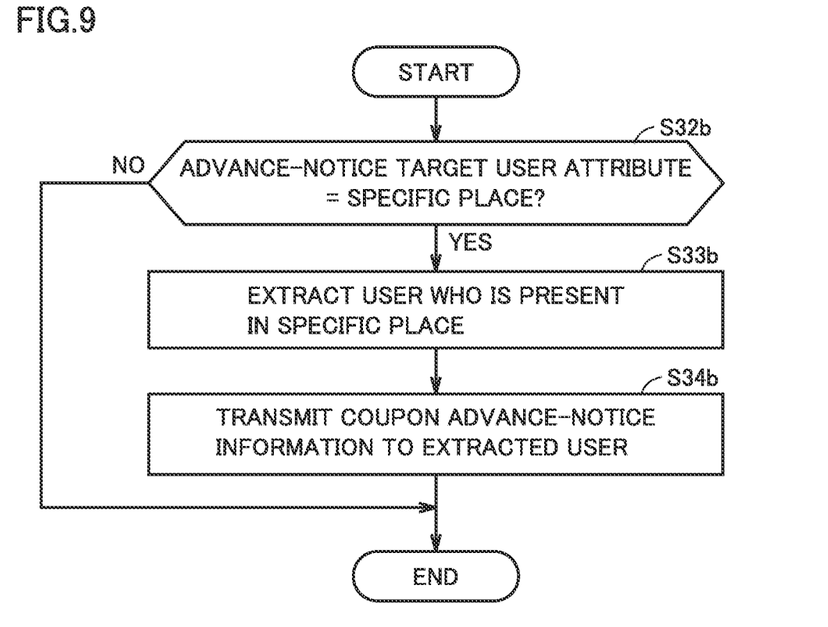
FIG. 9 is a second flowchart showing an exemplary procedure of the coupon advance-notice process performed by the server.

FIG. 9 is a flowchart showing an exemplary procedure of the coupon advance-notice process (step S31 of FIG. 7) performed by server 300 when the advance-notice target user attribute is set to the attribute representing "the presence in the specific place".

Server 300 determines whether or not the advance-notice target user attribute is set to the attribute representing "the presence in the specific place" (step S32b). It should be noted that the "specific place" can be set to the place of a different shop located around shop 11, for example.

When the advance-notice target user attribute is not set to the attribute representing "the presence in the specific place" (NO in step S32b), server 300 skips subsequent processes and ends the process.

When the advance-notice target user attribute is set to the attribute representing "the presence in the specific place" (YES in step S32b), server 300 extracts a user who is present in the specific place by making reference to the user attribute information (FIG. 6) stored in storage device 320 (step S33b).

Next, server 300 transmits the coupon advance-notice information to mobile terminal 400 of the extracted user (step S34b). Accordingly, the $CO_2$ free charging and the visiting to shop 11 can be promoted appropriately to the user who is present in the specific place (for example, a different shop located around shop 11).

As described above, server 300 according to the present embodiment issues, to the user of vehicle 100 in which the $CO_2$ free charging is performed, the coupon usable at shop 11 located around power supply facility 200. Further, the user who has the advance-notice target user attribute (specific attribute) is notified of the coupon advance-notice information about the coupon to be issued. Accordingly, the coupon advance-notice information can be notified by targeting the user who has the advance-notice target user attribute (specific attribute). As a result, the $CO_2$ free charging and the visiting to shop 11 can be promoted appropriately to the user who has the specific attribute.

Further, when the advance-notice target user attribute is an attribute representing "the tendency to visit the shop in the specific time period", server 300 extracts a user who tends to visit the shop in the specific time period by making reference to the user attribute information, and transmits the coupon advance-notice information to the extracted user. Accordingly, the coupon advance-notice information can be notified by targeting the user who tends to visit the shop in the specific time period.

For example, when the "specific time period" is set to a time period in which the customer attracting rate of shop 11 is higher than the predetermined rate (for example, an evening time period in which the shop is considerably crowded), server 300 transmits the coupon advance-notice information to mobile terminal 400 so as to indicate that a coupon is to be issued in a time period in which the customer attracting rate of shop 11 is lower than the predetermined rate (for example, a daytime time period on a weekday in which the shop is not so crowded). Accordingly, it can be expected to level out a crowded situation in shop 11. Moreover, since the user can receive a profit of the coupon in the time period in which shop 11 is not so crowded, a waiting time for the $CO_2$ free charging can be utilized more effectively.

Further, when the advance-notice target user attribute is the attribute representing "the presence in the specific place", server 300 extracts a user who is present in the specific place by making reference to the user attribute information, and transmits the coupon advance-notice information to the extracted user. Therefore, by setting the "specific place" to the place of a different shop located around shop 11, the $CO_2$ free charging and the visiting to shop 11 can be promoted appropriately to the user who is present in the different shop, for example.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A charging processing system comprising:
   a power supply facility that supplies $CO_2$ free power generated using renewable energy;
   a plurality of electrically powered vehicles that each perform $CO_2$ free charging to charge an onboard power storage device using the $CO_2$ free power supplied from the power supply facility;
   a plurality of respective mobile terminals portable by a plurality of respective users each of who owns a corresponding electrically powered vehicle; and
   a server that issues a coupon to a mobile terminal of a user of an electrically powered vehicle in which the $CO_2$ free charging is performed among the plurality of electrically powered vehicles, the coupon being usable at a shop located around the power supply facility, wherein
   the server includes
      a storage device that stores, for each of the plurality of users, user attribute information in which information for specifying each of the plurality of users and information indicating an attribute of each of the plurality of users are associated with each other, and
      a control device that extracts a user who has a specific attribute by making reference to the user attribute information and that notifies, to a mobile terminal of the extracted user, coupon advance-notice information about the coupon to be issued.

2. The charging processing system according to claim 1, wherein the user attribute information includes information about a time period in which each of the plurality of users tends to visit the shop, and when the specific attribute represents a tendency to visit the shop in a specific time period, the control device extracts a user who tends to visit the shop in the specific time period by making reference to the user attribute information, and notifies the coupon advance-notice information to a mobile terminal of the extracted user.

3. The charging processing system according to claim 2, wherein the specific time period includes a time period in which a customer attracting rate of the shop is higher than a predetermined rate, and the coupon advance-notice information includes information indicating that the coupon is issued in a time period in which the customer attracting rate of the shop is lower than the predetermined rate.

4. The charging processing system according to claim 1, wherein the user attribute information includes location information of each of the plurality of users, and when the specific attribute represents presence in a specific place, the control device extracts a user who is present in the specific place by making reference to the user attribute information, and notifies the coupon advance-notice information to a mobile terminal of the extracted user.

* * * * *